UNITED STATES PATENT OFFICE 2,538,907

PREPARATION OF NITROXYETHYL-DINITRO-GUANIDINE

Arthur F. McKay, Ottawa, Ontario, Canada, assignor to The Minister of National Defence of Canada, Ottawa, Ontario, Canada No Drawing. Application October 24, 1949, Serial No. 123,311. In Canada September 21, 1949

5 Claims. (Cl. 260—467)

This invention relates to a linear derivative of nitroguanidine and to a process of producing the same.

It has previously been believed that it was not possible to produce the linear dinitro derivatives of disubstituted guanidine. The difficulties encountered are set forth for instance in 55 J. A. C. S., vol. 55, page 731 (1933), Davis and Elderfeld. I have now succeeded in preparing N-β-nitroxyethyl - N - nitro - N' - nitroguanidine. This compound finds application in propellent mixes particularly as a modificant of nitroguanidine and is also useful as an intermediate in the preparation of further substitution products.

According to the invention N-β-nitroxyethyl-N-nitro-N'-nitroguanidine is prepared by nitrating β-hydroxyethyl-nitroguanidine with a mixture of nitric acid and acetic anhydride. The nitration may be carried out in two stages passing through an intermediate compound, or may be carried out in a single stage depending upon the conditions of nitration. The reaction is schematically illustrated as follows:

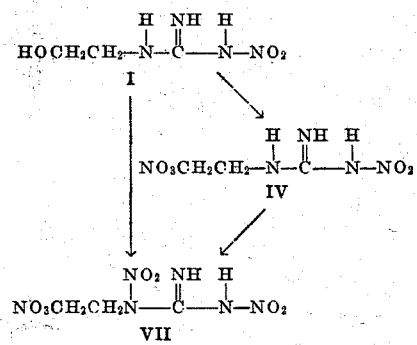

The conditions of the nitration are most important and the nitration agent generally should contain approximately mol equivalents of nitric acid and acetic anhydride, however, since the primary function of the acetic anhydride is to remove the elements of water from the reaction mixture as they are formed during the nitration, the reaction will proceed satisfactorily provided the acetic anhydride present is at least the molar equivalent of the β-hydroxyethyl-nitroguanidine entering into the reaction. As far as the amount of nitric acid is concerned I have found that in order to produce the intermediary between 2-4 mols of nitric acid (in terms of the product produced) should be present and in order to proceed from the intermediary to the final product or from the β-hydroxyethyl-nitroguanidine directly to the final product at least 5 mol equivalents are necessary.

Elevated temperatures increase the rate of reaction but, as in dealing with most nitration reactions, a certain amount of fuming occurs which increases as the temperature is raised. The most favourable temperature for the conversion from β-hydroxyethylnitroguanidine to the intermediate is $-5°$ C. (but satisfactory results may be obtained at temperatures ranging from $-10°$ C. to $+5°$ C.). For the conversion from the intermediate to the final product or for a direct nitration from the β-hydroxyethylnitroguanidine to the final product I have found that a temperature range of between 40 and 47° C. is preferable, although temperatures ranging from 30 to 60° C. give worthwhile results. Higher temperatures tend to increase fuming to an undesirable extent and make proper control of the reaction difficult. In proceeding from the β-hydroxyethylnitroguanidine directly to the final product, the reaction generally is complete in about 15 minutes' time while, if the starting material is the intermediate compound the reaction generally takes only about 5 minutes.

Although the absence of water is essential to the progress of the reaction, once the reaction is complete the presence of water has no deleterious effect and the reaction products may be precipitated with water or may be poured over cracked ice.

My invention is further illustrated by the following specific examples, given by way of illustration only.

Example I

A nitration mixture of 2.75 cc. (0.113 mol) of 99.8% nitric acid in 5.80 cc. of acetic anhydride was prepared at 0° and maintained at this temperature for a period of five minutes while 2.80 g. (0.0189 mol) of β-hydroxyethylnitroguanidine was added. The temperature then rose spontaneously after which it was held at 40–47° for thirty minutes. During this time a considerable quantity of gas was evolved. Finally the reaction mixture was poured onto about 50 g. of ice. The white solid was filtered off and washed with water, yield 1.1 g. (24.4%). The crude product (M. P. 81–82°) was purified by dissolving in boiling methanol (6 cc./g.) adding water (2 cc./g.) and then allowing to cool. The pure product melted at 84.5–85.3° C., yield 0.7 g. This compound gave a strong secondary nitramine colour reaction.

Anal.:

Calcd. for $C_3H_6N_6O_7$: C, 15.1; H, 2.52; N, 35.3
Found: C, 15.1; H, 2.62; N, 35.5

*Example II*

β-Nitroxyethylnitroguanidine (4.0 g., 0.020 mol) was added to a solution of 1.95 cc. (0.092 mol) of 99.8% nitric acid in 6.3 cc. of acetic anhydride at 0° over a period of five minutes. Then the mixture was heated in a water bath at 50° for thirty-five minutes after which it was poured onto ice. The precipitate was filtered off and washed with water, yield 1.7 g. (34.8%). The purified product (1.5 g.) melted at 84.7–85.3° alone and admixed with an authentic sample of N-β-nitroxyethyl-N-nitro-N'-nitroguanidine.

What I claim as my invention is:

1. N-β-nitroxyethyl-N-nitro-N'-nitroguanidine having the formula

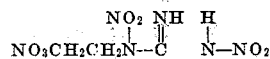

2. Process of preparing N-β-nitroxyethyl-N-nitro-N'-nitroguanidine comprising nitrating a compound of the formula

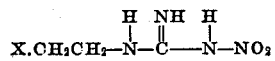

where X is a member of the group consisting of OH and NO₃ with a nitration agent consisting of at least 5 mols of nitric acid per mol of said compound and at least 1 mol of acetic anhydride per mol of said compound, the temperature during the nitration reaction being maintained within the range of 30 to 60° C.

3. The process as claimed in claim 2, in which the temperature throughout the reaction is maintained within the range of 40 to 47° C.

4. A process as defined in claim 2 in which the nitration agent contains about 8 mols of nitric acid per mol of said compound.

5. A process as defined in claim 3 in which the nitration agent contains about 8 mols of nitric acid per mol of said compound.

ARTHUR F. McKAY.

No references cited.